US006775751B2

(12) United States Patent
Tremaine (10) Patent No.: US 6,775,751 B2
(45) Date of Patent: Aug. 10, 2004

(54) SYSTEM AND METHOD FOR USING A COMPRESSED MAIN MEMORY BASED ON DEGREE OF COMPRESSIBILITY

(75) Inventor: Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 10/213,840

(22) Filed: Aug. 6, 2002

(65) Prior Publication Data

US 2004/0030847 A1 Feb. 12, 2004

(51) Int. Cl.[7] .............................................. G06F 13/00
(52) U.S. Cl. ...................... 711/154; 711/133; 711/202; 710/68
(58) Field of Search ............................... 711/133, 154, 711/202; 710/68

(56) References Cited

U.S. PATENT DOCUMENTS 5,710,909 A * 1/1998 Brown et al. ............... 711/170
6,446,145 B1    9/2002 Har et al.
6,457,104 B1    9/2002 Tremaine et al.
6,519,733 B1    2/2003 Har et al.
6,549,995 B1    4/2003 Schulz et al.
2002/0124142 A1    9/2002 Har et al.
2002/0161932 A1 * 10/2002 Herger et al. ............... 709/321

* cited by examiner

Primary Examiner—Reba I. Elmore
(74) Attorney, Agent, or Firm—McGinn & Gibb, PLLC; Derek S. Jennings (57) ABSTRACT

A method and structure for reducing access latency and contention in a processing system is disclosed. The invention detects when the amount of available memory is outside a prescribed range, and responsively selects data blocks for compression (to add to the available memory,) or decompression (to use surplus available memory for uncompressed data,) until the amount of available memory is within the prescribed range. When data blocks are compressed, a DOC is determined and stored as an attribute in the directory entry associated with the data block. A most recently used list of recent data block addresses prevents those, as well those data blocks with poor DOC attributes, from being selected for recompression. All zero data blocks are detected to avoid standard compression/decompression overhead.

27 Claims, 5 Drawing Sheets

FIG.1

Prior Art

SYSTEM AND METHOD FOR USING A COMPRESSED MAIN MEMORY BASED ON DEGREE OF COMPRESSIBILITY

BACKGROUND OF THE INVENTION

1. Field of the Invention

The present invention generally relates to the field of compressed main memory architecture in computer systems, and more specifically to an improved method and apparatus for managing a compressed main memory or associated uncompressed cache.

2. Description of the Related Art

Computer main memory systems are now generally available that employ high speed compression/decompression hardware in the data flow paths between the main memory and the processors. Processor access to main memory within these systems is performed indirectly through the compressor and decompressor apparatuses, both of which add significantly to the processor access latency overhead, but facilitate significantly lower storage expense.

Large cache memories are implemented between the processor and the compressor and decompressor hardware to reduce the frequency of processor references to the compressed memory, mitigating the effects the high compression/decompression latency. These caches contain uncompressed data and are generally partitioned into cache lines which are equal in size to the fixed data block size required by the compressor and decompressor. When a processor requests data that is not already located in the cache, the line which contains the requested data is located in the compressed memory, then read from the compressed memory, then decompressed and placed in the uncompressed cache. When no empty cache line is available, an existing cache line is selected for replacement, so that the existing cache line is removed from the cache, compressed and stored in the compressed memory, and replaced with the new cache line. Subsequent processor references in the locality of the initial reference and within the cache line are serviced directly from the uncompressed cache data, avoiding the latency associated with decompression. Three methods of uncompressed data caching are described.

A conventional independent cache array and associated directory provides the greatest performance, but at the highest cost. The performance is maximized as the cache and directory hardware can be optimized for lowest latency access by the processor and the main memory interface traffic is segregated from that of the cache interface. However, costs are associated with the cache array, directory, and associated hardware interfaces.

Hovis, et al. (U.S. Pat. No. 5,812,817 incorporated herein by reference) logically apportion an uncompressed cache memory region within the main memory. The cache controller and the memory controller share the same storage array via the same physical interface. Data is shuttled back and forth between the compressed main memory region and the uncompressed cache through the compression hardware during cache line replacement. Advantages for this scheme are that the compressed cache size can be readily optimized to specific system applications, and costs associated with an independent cache memory, directory and associated interfaces are eliminated. Performance is particularly disadvantaged by contention for the main memory physical interface by the latency sensitive cache controller.

Benveniste, et al. (U.S. Pat. No. 6,349,372 B1 incorporated herein by reference) describe a "virtual uncompressed cache" that consists of a predetermined number of uncompressed data blocks that are allowed to be stored in the uncompressed format within the compressed memory, in that same manner that an incompressible data block would be stored. No separate cache directory is needed, as all processor data references are located from the compressed memory directory. A FIFO list of uncompressed data blocks maintained, and when a new data block is uncompressed, it displaces a data block from the list. Data is shuttled out and in the compressed main memory through the compression/decompression hardware during data block replacement in the uncompressed list. This scheme is very low in cost, as no special cache memory or directory exists. However, performance is disadvantage by compressor/decompressor dataflow contention with processor data and directory references.

All of these schemes involve maintaining all the compressed memory content in the compressed format (when practical), while allowing a fixed quantity or cache of data in the uncompressed format. Data is only uncompressed (on demand) when a processor requests data that is not found in the uncompressed data set or cache. While this maximizes the available space in the main memory, the space is often not used. None of these schemes provide a means to compress/decompress data before the access to the data is requested. Therefore, a compressor/decompressor data traffic block is induced at the memory at the same time that the processor needs access to the memory, resulting in contention. Moreover, write traffic cannot be carried out until all the necessary data is available to the compressor, and the compressor has processed the data, (a period of hundreds of cycles), such that memory write stalls are common. All of these schemes also set aside large amounts of unused memory and rely on special software to mitigate a problem known as memory pressure. This memory pressure problem occurs when more memory is needed to store data in the compressed memory than is available at the time, due to poor overall compression rate and high real memory utilization.

It would be desirable to be able to maximize the space in the main memory to store data as opposed to having it unused. It would also be desirable to store as much uncompressed data in the main memory as practical, to reduce reference latency by avoiding the compression/decompression operations. It would also be desirable to retain in memory associated with each data block, the degree of compressibility for the data block after incurring the overhead of a compression operation, to mitigate needless compression activity on poorly compressible data blocks later on. Moreover, it would be desirable to be able to perform decompression/compression activity before a processor needs data, and when the main memory is otherwise not being used, to mitigate contention conditions with the processor access to the memory. Lastly, it would be desirable for the compressed memory manager hardware to instantly respond to memory pressure conditions, thereby reducing the size of wasteful memory reserves.

SUMMARY OF THE INVENTION

It is an object of the invention to provide a data management method, within a compressed memory system, to maximize the amount of the compressed main memory that is utilized for storing data in the uncompressed format to mitigate conditions where data access must incur compression and expansion latency penalties.

It is a further object of the invention to provide a method and apparatus to regulate the overall compressed main memory compression ratio by detecting when the amount of available memory is outside predetermined thresholds, and responsively begin selecting data blocks for compression (to add to the available memory,) or decompression (to use surplus available memory for uncompressed data,) while the memory system is not busy, or as a priority independent of busy conditions, until the amount of available memory is within predetermined thresholds.

The invention comprises a computer system having a memory having sectors of data blocks including compressed data blocks and uncompressed data blocks. A sector counter, operatively connected to the memory is adapted to maintain a used memory sector count of the memory. A compressed memory manager is operatively connected to the memory. The invention also has a compress memory threshold register operatively connected to the compressed memory manager that contains a compress memory threshold. A sector translation table is operatively connected to the memory and contains a touch bit indicating when the data block was last accessed. An expand memory threshold register is operatively connected to the compressed memory manager and contains an expand memory threshold. The compressed memory manager is adapted to compress data blocks in the memory when the used memory sector count is above the compress memory threshold. Less recently accessed data blocks are compressed before more recently accessed data blocks, based on the touch bit. The compressed memory manager is further adapted to decompress the data blocks when the used memory sector count is below the expand memory threshold.

The invention also has a memory controller operatively connected to the memory, the compressing and the decompressing are performed by the compressed memory manager only when the memory controller is not performing memory access requests. A priority compress memory threshold register is operatively connected to the compressed memory manager and contains a priority compress memory threshold. The compressed memory manager can be further adapted to compress the data blocks in the memory when the used memory sector count is above the priority compress memory threshold, irrespective of a memory access request activity of the memory controller. The sector translation table contains compression attributes of the data blocks including a zero attribute indicating a data block of all zeros. The compressed memory manager is further adapted to store data blocks having the zero attribute as a zero entry in the memory, wherein the zero entry avoids using memory sectors. The compressed memory manager is further adapted to compress data blocks having a higher compressibility attribute before compressing data blocks having a lower compressibility attribute.

The invention uses a method of utilizing a sectored compressed memory in a computer system. The method comprises monitoring a used memory sector count of the memory, compressing data blocks in the memory when the used memory sector count is above a compress memory threshold, and decompressing the data blocks when the used memory sector count is below an expand memory threshold. The invention compresses data blocks accessed less recently before compressing data blocks accessed more recently. The compressing and the decompressing are performed when the compressed memory manager in the computer system is not performing memory access requests. In addition, the invention compresses the data blocks in the memory when the used memory sector count is below a priority compress memory threshold, irrespective of a memory access request activity of the compressed memory manager. The invention always stores data blocks having all zeros as a zero entry in the memory, the zero entry avoids using memory sectors. The invention compresses data blocks having a higher compressibility before compressing data blocks having a lower compressibility. The decompressing only avoids decompressing uncompressed data blocks. The invention also avoids compressing data blocks held in a cache of the computer system.

According to the invention, a means to detect zero data exists in the data path to the compressor write buffer, for the purpose of indicating when the data in a given transfer cycle is all zero. When any transfer cycle for a given data block is not zero, then the data block is a non-zero data block. All non-zero data blocks are stored in the uncompressed format (bypassing the compressor,) when sufficient free memory exists. Otherwise data is compressed and stored as compressed when a spatial benefit exists. A 3-bit Degree of Compressibility (DOC) attribute is derived and saved in the compressed memory directory entry for every data block. When the amount of available memory is outside of the threshold bounds, a compressed memory manager is enabled to begin selecting the most compressible data blocks for releasing memory or compressed data blocks for expanding memory (through compression or decompression) while it scans the compressed memory directory DOC fields. This process continues until the available memory returns to within the predetermined threshold bounds.

When the invention is applied to systems with an uncompressed cache, only data blocks that are not cached are candidates for re-compression. The invention also rids stale data from the compressed main memory. Otherwise when an uncompressed cache is not employed, a small (typically 32, 64, or 128 entry) buffer of the most recent data block addresses that have been read from the main memory is maintained in hardware, and only data blocks not located in the buffer are candidates for recompression.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1:
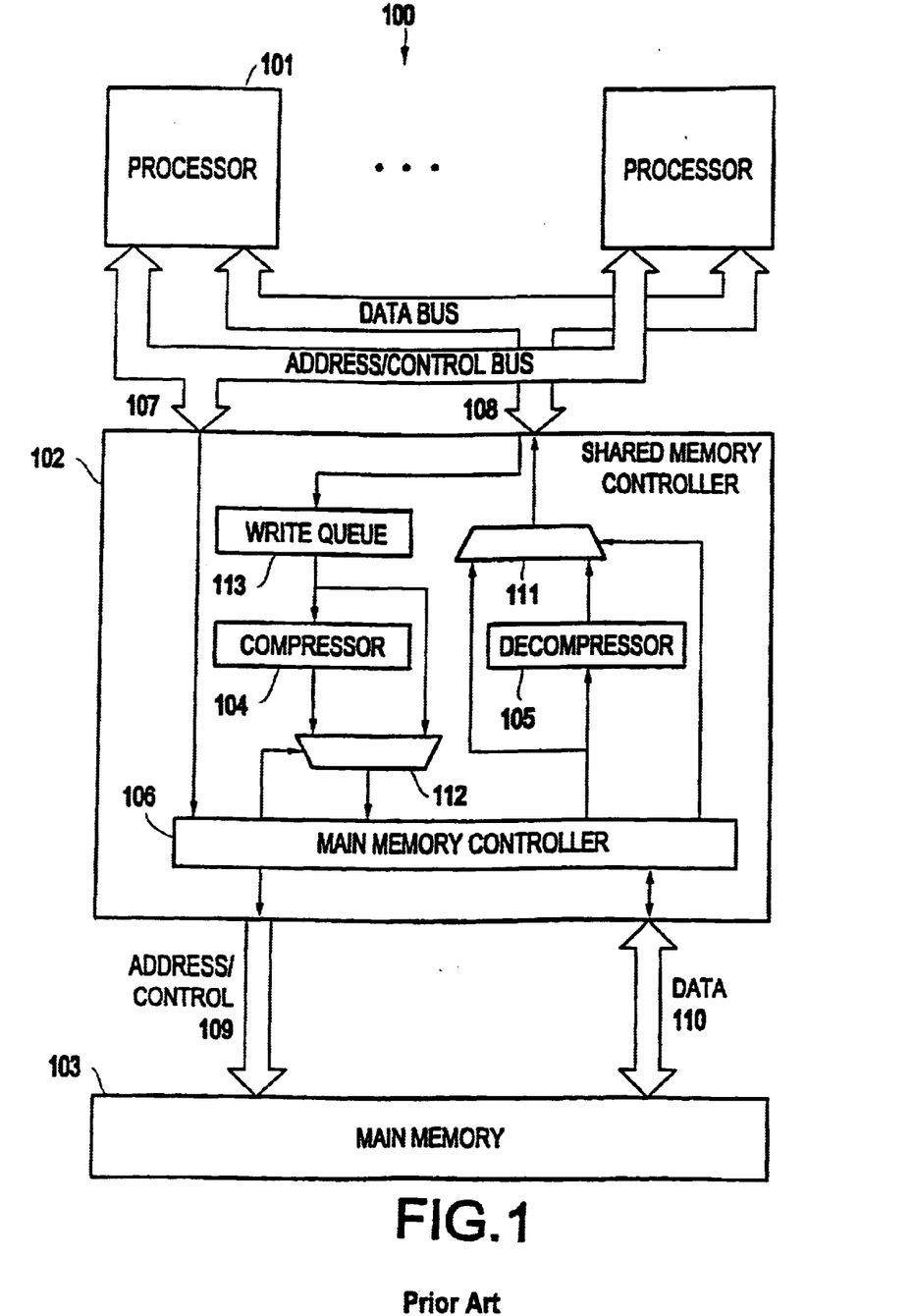
FIG. 1 illustrates a block diagram of a computer having a cache and a main memory system with hardware compressor and decompressor.

Referring now to the drawings, and more particularly to FIG. 1, a block diagram of a computer system 100 is shown.

The computer system includes one or more processors 101 connected to a common shared memory controller 102 that provides access to a system main memory 103. The shared memory controller contains a compressor 104 for compressing fixed size information blocks into as small a block as possible for ultimate storage into the main memory, a decompressor 105 for reversing the compression operation after the stored information is later retrieved from the main memory, and a write queue 113 for queuing main memory store request information block(s) destined for the compressor. The processor data bus 108 is used for transporting uncompressed information between other processors and/or the shared memory controller. Information may be transferred to the processor data bus 108 from the main memory 103, either through or around the decompressor 105 via a multiplexor 111. Similarly, information may be transferred to the main memory 103 from the processor data bus 108 to the write queue 113 and then either through or around the compressor 104 via a multiplexor 112.

The main memory 103 is typically constructed of dynamic random access memory (DRAM) with access controlled by a memory controller 106. Addresses appearing on the processor address bus 107 are known as Real Addresses, and are understood and known to the programming environment. Addresses appearing on the main memory address bus 109 are known as Physical Addresses, and are used and relevant only between the memory controller and main memory DRAM. Memory Management Block (MMU) hardware within the memory controller 106 is used to translate the real processor addresses to the virtual physical address space. This translation provides a means to allocate the physical memory in small increments for the purpose of efficiently storing and retrieving compressed and hence, variable size information.

The compressor 104 operates on a fixed size block of information, say 1024 bytes, by locating and replacing repeated byte strings within the block with a pointer to the first instance of a given string, and encoding the result according to a protocol. This process occurs through a byte-wise compare over a fixed length and is paced by a sequence counter, resulting in a constant completion time. The post process output block ranges from just a few bytes to the original block size, when the compressor could not sufficiently reduce the starting block size to warrant compressing at all. The decompressor 105 functions by reversing the compressor operation by decoding the resultant compressor output block to reconstruct the original information block by inserting byte strings back into the block at the position indicated by the noted pointers. Even in the very best circumstances, the compressor is generally capable of only ¼–½ the data rate bandwidth of the surrounding system. The compression and decompression processes are naturally linear and serial too, implying quite lengthy memory access latencies through the hardware.

Figure 2:
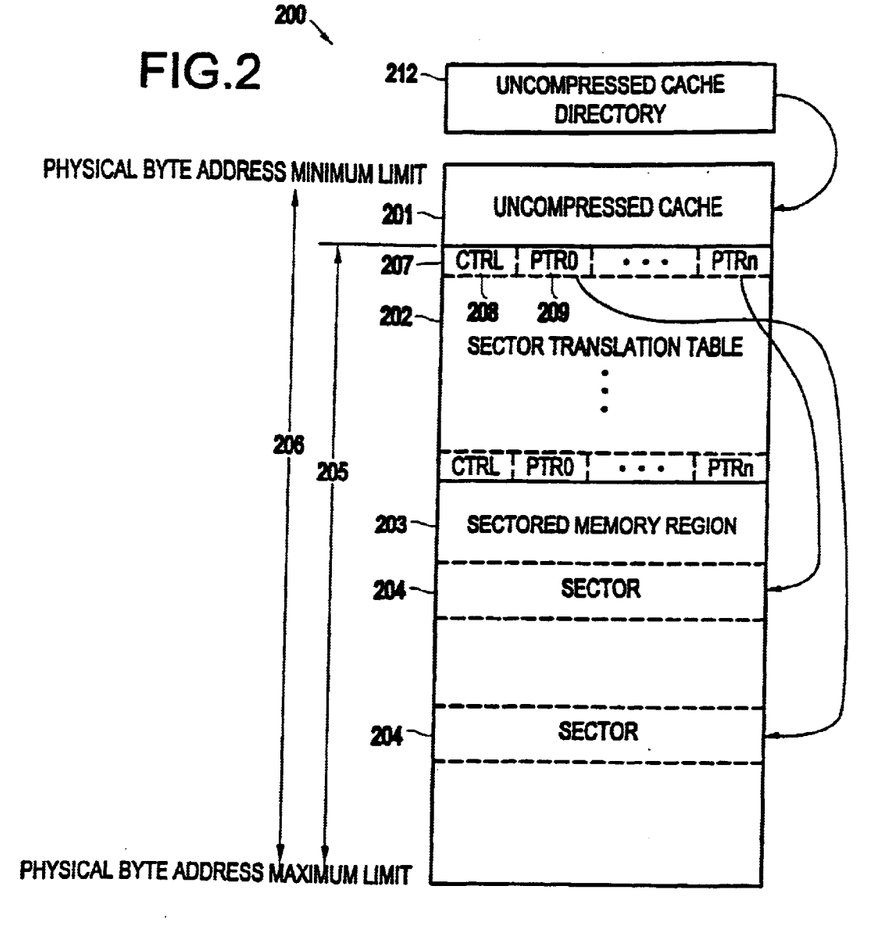
FIG. 2 illustrates memory address space partitioning.

Referring to FIG. 2, a structure for partitioning the main memory is shown as item 200. The compressed main memory 205 is a logical entity because it includes the processors(s) program and data as well as all the required data structures necessary to access the information. The logical compressed main memory 205 is physically partitioned from the physical memory address space 206. In some cases the main memory partition 205 is smaller than the available physical memory to provide a separate region to serve as a cache with either an integral directory, or one that is implemented externally 212. It should be noted that when implemented, the cache storage may be implemented as a region 201 of the physical memory 206, a managed quantity of uncompressed sectors, or as a separate storage array. In any case, when implemented, the cache controller will request accesses to the compressed main memory in a similar manner as a processor would if the cache were not present.

The logical main memory 205 is partitioned into the sector translation table 202, with the remaining memory being allocated to sector storage 203 which may contain compressed or uncompressed information, free sector pointers, or any other information as long as it is organized into sectors. The sector translation table region size varies in proportion to the real address space size which is defined by a programmable register within the system. Particularly, equation 1) governs the translation of the sector translation table region size as follows:

$$\text{sector translation table size} = \left(\frac{\text{real memory size}}{\text{compression block size}}\right) \cdot \text{translation table entry size} \quad (1)$$

Each entry is directly mapped to a fixed address range in the processor's real address space, the request address being governed in accordance with equation 2) as follows:

$$\text{sector translation table entry address} = \left(\frac{\text{real address}}{\text{compression block size}}\right) \cdot \text{translation table entry size} + \text{offset size} \quad (2)$$

For example, a mapping may employ a 16 byte translation table entry to relocate a 1024 byte real addressed compression block, allocated as a quantity 256 byte sectors, each located at the physical memory address indicated by a 25-bit pointer stored within the table entry. The entry also contains attribute bits 208 that indicate the number of sector pointers that are valid, size, and possibly other information. Every real address reference to the main memory causes the memory controller to reference the translation table entry 207 corresponding to the real address block containing the request address 210.

For read requests, the MMU decodes the attribute bits 208, extracts the valid pointer(s) 209 and requests the memory controller to read the information located at the indicated sectors 204 from the main memory sectored region 203. Similarly, write requests result in the MMU and memory controller performing the same actions, except information is written to the main memory. However, if a write request requires more sectors than are already valid in the translation table entry, then additional sectors need to be assigned to the table entry before the write may commence. Sectors are generally allocated from a list of unused sectors that is dynamically maintained as a stack or linked list of pointers stored in unused sectors. The absolute number of sectors allocated to store data is always known either by sectors used counter or sectors free counter, that is adjusted whenever sectors are transferred to/from the unused sector list. There are many possible variations on this translation scheme, but all involve a region of main memory mapped as a sector translation table and a region of memory mapped as sectors. Storage of these data structures in the DRAM based main memory provides the highest performance at the lowest cost, as well as ease of reverting the memory system into a typical direct mapped memory without compression and translation.

Having described a typical compressed main memory system, one embodiment of the invention is described in detail. According to the invention, three programmable registers provide a means to establish predetermined thresholds to detect when the allocated memory sector count is outside a prescribed range, for the purpose of having a compressed memory manager (CMM) hardware maximize the amount of uncompressed data within the compressed memory. The Expand Memory Threshold (EMT), Compress Memory Threshold (CMT), and the Priority Compress Memory Threshold (PCMT) registers are always compared against the sectors used counter. When the sectors used counter value is less than the EMT, the CMM hardware is enabled to locate and expand compressed data blocks. Conversely, when the sectors used counter value is greater than the CMT or PCMT, the CMM hardware is enabled to locate and compress expanded data blocks. When enabled, CMM only operates when the memory is not busy servicing processor induced access requests, except when the CMM is enabled by the PCMT. In this case, CMM operates without regard to processor activity, to maximize the amount of memory sectors being released to the unused pool through compression, thereby alleviating memory pressure conditions when the unused sector pool becomes dangerously low.

When the CMM references the STT, it will access a block of STT entries, typically 4 to 16. The CMM can also be implemented to reference the STT periodically according to a programmable register. Software can reprogram the registers at any time during system operation to redefine the regulation boundaries to accommodate new runtime memory requirements. A level of hysteresis is applied to the thresholds to avoid CMM oscillating between expansion and compression modes when dithering the sectors used count around the thresholds. For example, the CMM is enabled when sectors used counter value>the CMT, and remains so until the sectors used counter value falls below the CMT—hysteresis offset (typically 64). All further references to any threshold imply a hysteresis offset without explicitly stating so.

As described above, some data block patterns are so highly compressible, that the compressed result is small enough to fit within the associated STT entry itself along with a special bit to indicate so, requiring no available memory sectors. This invention provides a means to detect the "all zeros" case of such data block patterns without having to incur the normal compressor and decompressor overhead (latency and bandwidth), thus permitting that hardware to operate on other data blocks in parallel. The "zero data compressor" detects when zero data exists in the data path to the compressor write buffer, for the purpose of indicating when the data in a given transfer cycle is all zero. When any transfer cycle for a given data block is not zero, then the data block is a non-zero data block, otherwise the data block is a "zero" case and can be stored immediately as a specially encoded STT entry. All "zero" data blocks are always stored compressed to gain compression efficiency. When a "zero" case is decoded during a memory read access, the memory controller simply provides an all zero reply with no data block decompression operation. All non-zero data blocks are stored in the uncompressed format (bypassing the compressor,) when sufficient free memory exists, otherwise data is compressed and stored as compressed when a spatial benefit exists.

Figure 6:
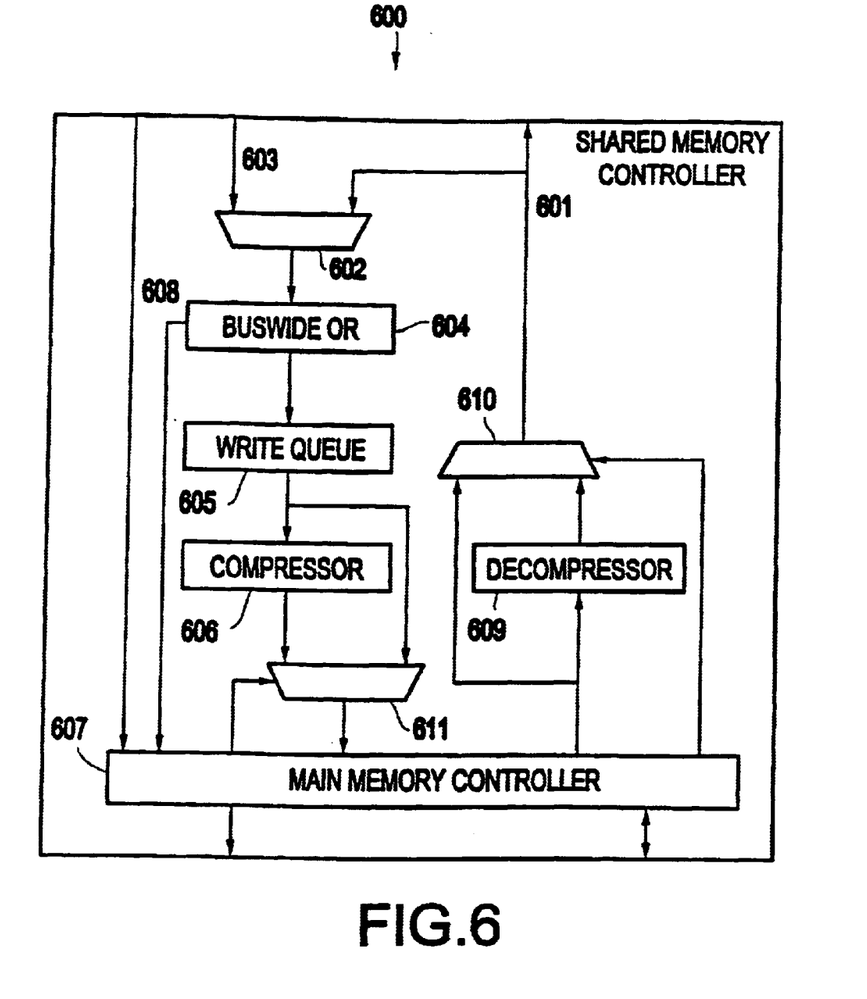
FIG. 6 illustrates a memory control apparatus according the principals of the present invention.

Referring to FIG. 6, shown is a memory control apparatus having a means to detect all zero data blocks according to the principals of the present invention. In the dataflow to 601 and from 603 the processor is improved with multiplexor 602 to provide a means to wrap decompressor 609 output data 601 to the compressor 606 through write queue 605, to provide the means for the memory controller 607 to carry out compression of uncompressed main memory data blocks or expansion of compressed main memory data blocks. Further, the bus-wide logical OR function 604 provides the means to detect when any particular cycle associated with a data block transfer from either the processor data bus 603 or the decompressor data bus 601, to the compressor 606 write queue 605, is not zero. This logic condition is conveyed to the memory controller 607 by logic signal 608. Compression under memory control has uncompressed data blocks bypass decompressor 609 by multiplexor 610 to flow through multiplexor 602 to write queue 605 through zero detector 604, such that data can be written back to memory either through or bypassing compressor 606 by multiplexor 611. Expansion under memory control has compressed data blocks flow through decompressor 609 to write queue 605 through multiplexor 610 and multiplexor 602, and through zero detector 604, such that data can be written back to memory, bypassing compressor 606 by multiplexor 611, as an "all zero" special case or uncompressed.

Figure 3:
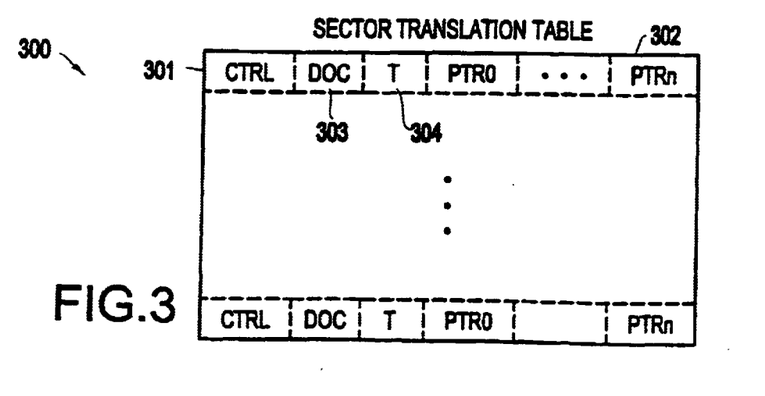
FIG. 3 illustrates a compressed memory sector translation table modified according to the principals of the present invention.

Referring to FIG. 3, shown is an improved compressed memory sector translation table (STT) 302, modified according to the principals of the present invention. A touch (T) bit 304 is included in each STT entry 301, to indicate when a processor has accessed a particular data block. This bit is set whenever a STT entry is accessed to service a processor read or write request. The CMM resets this bit while updating any STT.

A 3-bit Degree of Compressibility (DOC) attribute field 303 is included in each SST entry 301, to decode eight unique compression attributes. The DOC includes: "Zero" to represent that the data block is an "all zero" special case. The all zero special case is compressed into an SST entry using no compressed memory sectors, bypasses compressor and never decompressed. The DOC also includes "special" to represent that the data block has total (special case, but not zero) compressibility. The "special" case is compressed into an SST entry using no compressed memory sectors. The DOC includes "high" to represent that the data block has high compressibility. The "high" compressed data block requires 1 or 2 memory sectors of main memory storage. The DOC also includes "medium" to represent that the data block has medium compressibility. The "medium" compressed data block requires 3 memory sectors of main memory storage. The DOC includes "low" to represent that the data block has low compressibility. The "low" compressed data block requires 4 memory sectors of main memory storage, but is not a nil case. The DOC also includes "unknown" to represent that the data block has unknown compressibility. The "unknown" uncompressed data block has never been compressed, bypassed the compressor, or has been modified since last compression. The DOC includes "nil" to represent that the data block is not compressible, i.e., compression not practical. The DOC also includes "never" to represent that the data block is never to be compressed. The "never" is only set by software for application specific performance optimizations when compression is to be avoided for a given data block.

DOC values "zero" through "nil" are established by hardware, and DOC value of "never" is established or changed by software. When the CMM is compressing memory, it selects the most beneficial uncompressed data blocks for compression, e.g., data blocks with the highest compressibility. When the CMM is expanding memory, only compressed or unknown data blocks are selected for decompression. When the invention is applied to systems with an uncompressed cache, only data blocks that are not cached are candidates for re-compression. Otherwise, a small buffer (typically 32 or 64) of the most recent data block addresses that have been read from the main memory is maintained in hardware, and only data blocks not located in the buffer are candidates for recompression. During initialization, the entire physical memory is filled with a pattern to establish valid error correction. The STT encoding is defined in such a way to allow the replicated fill pattern that can be decoded as a valid STT "all zero" case. The memory is as fully compressed as possible at this time. As data is written into the memory during the software "boot", the memory controller will begin decompressing data blocks and allocating sectors to accommodate the new data, as well as setting the associated T bits. No data blocks are ever compressed until the sectors used count rises above the EMT. While the count is below the EMT, CMM will be scanning the STT for compressed data that can be expanded, although none will be detected, the T bits will be reset. When or if the sectors used count rises beyond the CMT, then CMM will begin scanning the STT for data blocks, reading the uncompressed data, compressing, and then restoring the compressed data for those data blocks with a DOC other than low or nil and not T, and in all cases updating the STT entry to reflect the computed DOC and reset the T bit. Recompressing the data frees up sectors, reducing the sectors used count. When the count falls below the CMT, the CMM stops. Over time, this process will tend to result in the most compressible, least referenced, and all the zero data blocks being compressed, while maintaining the maximum amount of uncompressed data in the available memory.

Figure 4:
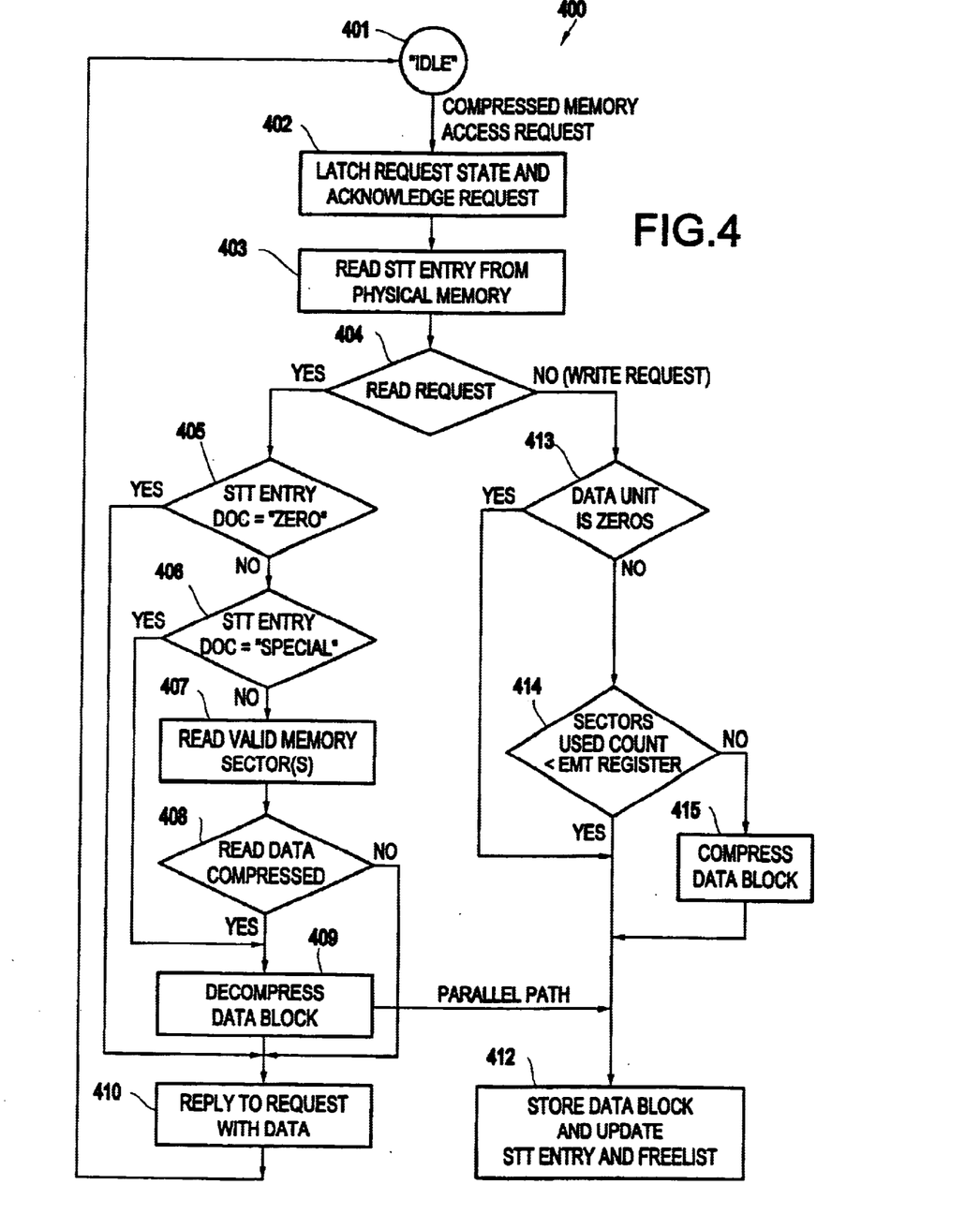
FIG. 4 illustrates a state diagram for the method of accessing a cacheless compressed main memory access control according to the principals of the present invention.

Referring to FIG. 4, shown is a state diagram for the method of accessing a compressed main memory with special provisions for maximizing the amount of uncompressed data within the memory, and for specially handling all zero data blocks. Initially the memory controller remains in the idle state 401 until a request to access the memory is asserted. At such time, the request state (address, read/write, size, and all zero indication) is captured in a request buffer and the request phase is acknowledged. Then the direct mapped STT entry indexed from the request address is read from the memory and decoded at step 403.

During a memory read access request decision from step 404, all zero data blocks detected at step 405, are complete after an immediate data reply to the request at step 410. Special case data blocks detected at step 406, must first be decompressed at step 409, before a data reply is issued for the data request at step 410, and in parallel, the invention stores the uncompressed data back into the memory at step 412. All other data cases proceed from step 404 through 405 and 406 to step 407, where the data is read from the memory sectors indicated by the STT entry. When the STT entry indicates that the data is compressed at step 408, then it is decompressed at step 409 before the reply 410 and in restore of as uncompressed at step 412. Otherwise, when the data is already uncompressed at step 408, the data reply is immediately performed at step 410.

During a memory write access request decision from step 404, if the data block was determined to be all zero at step 413, then the data block is stored as a specially encoded STT entry 412. Non-zero data blocks are also directly stored to memory if sufficient storage is available (sectors used count<EMT register) 414, otherwise the data is first compressed at step 415 before storing the data.

Figure 5:
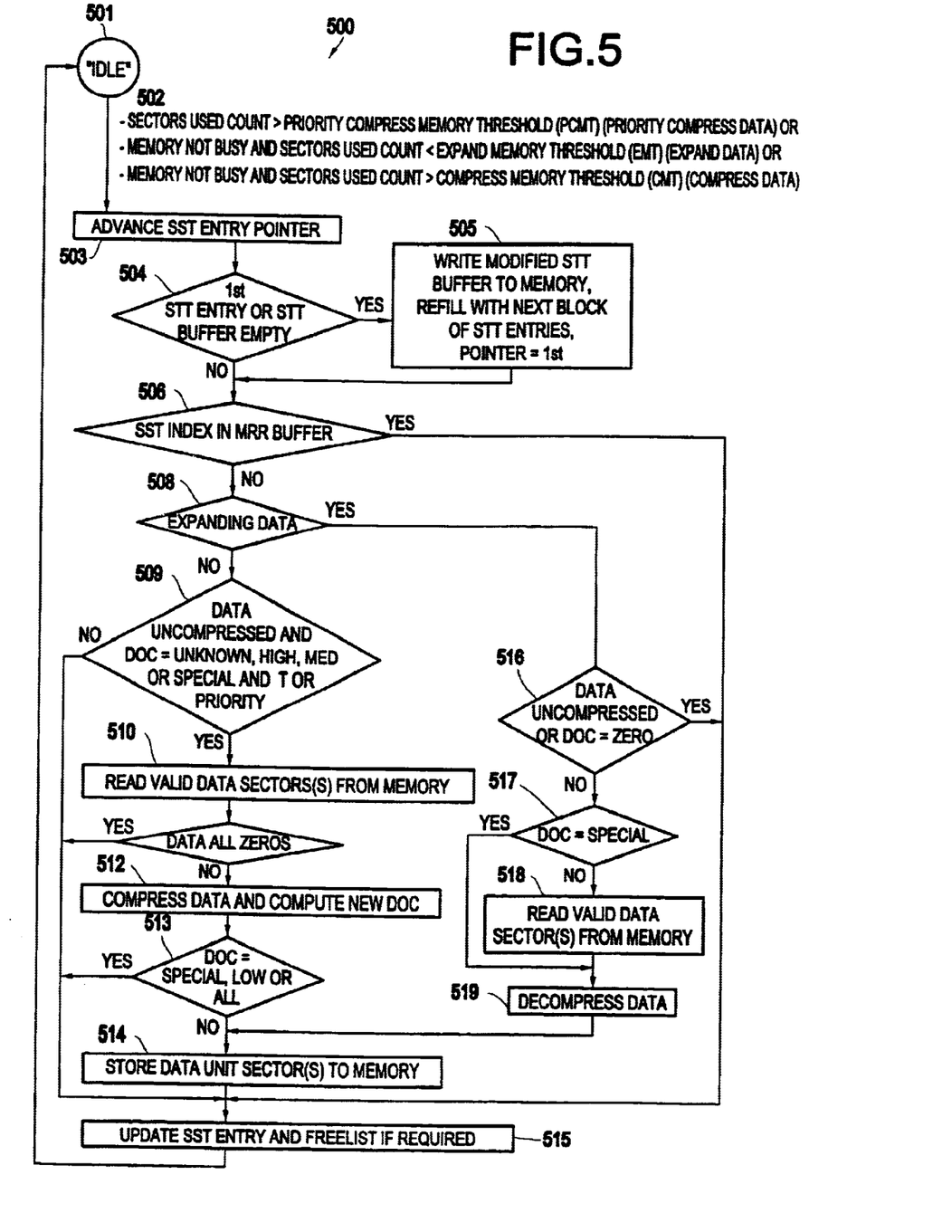
FIG. 5 illustrates a state diagram for the method of dynamically maintaining an optimal amount of uncompressed data within a cacheless compressed memory, with respect to the overall memory compression rate, according to the principals of the present invention.

Referring to FIG. 5, shown is a compressed memory manager (CMM) state diagram for the method of regulating data compression in a compressed main memory, for the purpose of having a maximum amount of uncompressed data while maintaining overall storage utilization within a prescribed range. The CMM regulates the utilization of the main memory by alternatively compressing or expanding data blocks within the main memory, depending on the most recently used state, degree of compressibility (DOC). The CMM sequentially reads and writes each block of STT entries over the entire STT range in memory. The CMM first empties the buffer and then reads the next block of entries. Any access to the range of STT entries held in the STT buffer is serviced from the buffer, in lieu of referencing the STT entries directly in STT memory. The CMM sequentially operates on each STT entry in the buffer before the buffer is written back to memory. Initially and when disabled by a programmable enable bit, the CMM is at Idle state 501. However, when enabled, The CMM responds to conditions 502 when the allocated memory sector count or sectors used counter, is outside the range defined by the Expand Memory Threshold (EMT) (expanding data), Compress Memory Threshold (CMT) (compressing data), or the Priority Compress Memory Threshold (PCMT) (priority compressing data) registers. At such time the buffer pointer is advanced 503, and when the buffer is empty or the buffer pointer has wrapped to the first entry at step 504, then the full buffer is written back to memory, and the next block of STT entries is read from memory to fill the buffer at step 505. Otherwise, if the buffer pointer selects a valid STT entry at step 504. The CMM skips over the STT entries that are found in the most recently read (MRR) buffer 506, however the touch (T) bit is still reset at step 515 and the CMM control loops back to the idle state 501. The CMM evaluates entries that are not skipped at step 506, in the context of expansion or compression 508.

Compressing data that is already compressed (or is poorly compressible) is unnecessary. If the data block has been recently referenced (T set) and memory is not being compressed at a priority, then the CMM skips compression of the selected data block 509, and resets the T bit before control is returned to the idle state 501. Otherwise from step 509, data will be compressed, but must be first read from the memory at locations specified in the STT entry at step 510. Data blocks that are detected to contain all zeros skip compression at step 511. Otherwise data blocks are compressed 512, and those that compress completely into the STT entry 513, result in the STT entry DOC update, T bit, and data block memory being released to the "free memory" pool 515. Data blocks that are not beneficially compressible 513 remain unchanged in memory and only receive a DOC update and T bit reset 515. Otherwise from step 513, compressed data is stored in main memory 514 before the STT entry DOC is updated, T is reset, new compressed data location is updated, and data block memory is released to the "free memory" pool 515. Then, control is returned to the idle state 501.

Expanding data that is already uncompressed or all zero compressed is unnecessary 516, so again only the T bit need be reset at step 515 before the CMM control returns to the idle state 501. Otherwise at step 516, data is to be decompressed at step 519. Thus, the compressed data is either derived from the STT entry itself when DOC=special 517 or it is read 518 from the main memory at the locations indicated by the STT entry, before it can be decompressed at step 519. The uncompressed data is stored back in main memory at step 514, and the STT entry is updated with the new locations of the uncompressed data, and T is reset before CMM control is returned to the idle state 501.

This embodiment represents the lowest cost implementation, without a caching structure. However, this invention can be used together with a conventional independent cache to yield a higher performance. Although the above embodiment suggests that the CMM only function when the threshold conditions 502 are true, the CMM function can also be to a periodic interval for "scrubbing" the STT memory to detect and remove "soft" errors that can accumulate in the DRAM. Although the preferred embodiment describes an separate "compressed" flag in the STT entry, this state can be aggregated into the degree of compressibility (DOC) tag to provide encoding space for additional compressibility attributes.

Although the preferred embodiment specifically claims a special "zero" data block detector and method for bypassing the compressor and decompressor apparatus for such cases, those skilled in the art will recognize that such a detector can easily be enhanced to detect any repeating fixed length pattern in a data flow path. The "zero" case is the most predominant case in computer systems, but it is recognized that small performance gains can be realized when the detector is designed to detect any repeating pattern of a predetermined fixed length.

Compressed main memory systems employing this invention benefit from an overall lower memory read latency (higher performance), while still retaining the advantages afforded by memory compression. This invention provides an autonomic means to balance the overall memory compression rate against the storage demands from the processor (s), such that the available memory is maximally utilized for storing data and program code. Any system that employs memory compression can realize performance benefits from this invention. Such systems include, but are not limited to; network or IO adapter caches, disk storage sub-system caches, and processor main memory systems. Other systems may benefit from the claimed means to detect and process "zero" filled data blocks in hardware. Particularly, applications that are required to transfer blocks of data can benefit from detecting these cases and transferring a code indicating a "zero" data block, thereby freeing up communication channel bandwidth for other transfers While the invention has been described in terms of preferred embodiments, those skilled in the art will recognize that the invention can be practiced with modification within the spirit and scope of the appended claims.

What is claimed is:

1. A computer system comprising:
    a memory having sectors of data blocks including compressed data blocks and uncompressed data blocks;
    a sector counter operatively connected to said memory and being adapted to maintain a used memory sector count of said memory;
    a compressed memory manager operatively connected to said memory;
    a compress memory threshold register operatively connected to said compressed memory manager and containing a compress memory threshold; and
    an expand memory threshold register operatively connected to said compressed memory manager and containing an expand memory threshold,
    wherein said compressed memory manager is adapted to compress data blocks in said memory when said used memory sector count is above said compress memory threshold, and
    wherein said compressed memory manager is further adapted to decompress said data blocks when said used memory sector count is below said expand memory threshold.

2. The computer system in claim 1, further comprising a memory controller operatively connected to said memory, wherein said compressing and said decompressing are performed by said compressed memory manager only when said memory controller is not performing memory access requests.

3. The computer system in claim 2, further comprising a priority compress memory threshold register operatively connected to said compressed memory manager and containing a priority compress memory threshold,
    wherein said compressed memory manager is further adapted to compress said data blocks in said memory when said used memory sector count is above said priority compress memory threshold, irrespective of memory access request activity of said memory controller.

4. The computer system in claim 1, further comprising a sector translation table operatively connected to said memory and containing compression attributes of said data blocks.

5. The computer system in claim 4, wherein said compression attributes include a zero attribute indicating a data block of all zeros,
    wherein said compressed memory manager is further adapted to store data blocks having said zero attribute as a zero entry in said memory, wherein said zero entry avoids using memory sectors.

6. The computer system in claim 4, wherein said compression attributes include a non-compressible attribute, a never compress attribute, and an unknown compressibility attribute.

7. The computer system in claim 1, wherein said compressed memory manager is further adapted to compress data blocks having a higher compressibility attribute before compressing data blocks having a lower compressibility attribute.

8. A computer system comprising:
    a memory having sectors of data blocks including compressed data blocks and uncompressed data blocks;
    a sector counter operatively connected to said memory and being adapted to maintain a used memory sector count of said memory;
    a compressed memory manager operatively connected to said memory;
    a compress memory threshold register operatively connected to said compressed memory manager and containing a compress memory threshold;
    a sector translation table operatively connected to said memory containing a touch bit indicating when said data block was last accessed; and
    an expand memory threshold register operatively connected to said compressed memory manager being containing an expand memory threshold,
    wherein said compressed memory manager is adapted to compress data blocks in said memory when said used memory sector count is above said compress memory threshold,
    wherein less recently accessed data blocks are compressed before more recently accessed data blocks, based on said touch bit, and
    wherein said compressed memory manager is further adapted to decompress said data blocks when said used memory sector count is below said expand memory threshold.

9. The computer system in claim 8, further comprising a memory controller operatively connected to said memory, wherein said compressing and said decompressing are performed by said compressed memory manager only when said memory controller is not performing memory access requests.

10. The computer system in claim 9, further comprising a priority compress memory threshold register operatively connected to said compressed memory manager and containing a priority compress memory threshold, wherein said compressed memory manager is further adapted to compress said data blocks in said memory when said used memory sector count is above said priority compress memory threshold, irrespective of a memory access request activity of said memory controller.

11. The computer system in claim 8, wherein sector translation table contains compression attributes of said data blocks including a zero attribute indicating a data block of all zeros, wherein said compressed memory manager is further adapted to store data blocks having said zero attribute as a zero entry in said memory, wherein said zero entry avoids using memory sectors.

12. The computer system in claim 8, wherein said compressed memory manager is further adapted to compress data blocks having a higher compressibility attribute before compressing data blocks having a lower compressibility attribute.

13. The computer system in claim 8, wherein sector translation table contains compression attributes of said data blocks including a non-compressible attribute and a never compress attribute.

14. A method of utilizing a sectored compressed memory in a computer system, said method comprising:

monitoring a used memory sector count of said memory;

compressing data blocks in said memory when said used memory sector count is above a compress memory threshold; and decompressing said data blocks when said used memory sector count is below an expand memory threshold.

15. The method in claim 14, wherein said compressing and said decompressing are performed when a compressed memory manager in said computer system is not performing memory access requests.

16. The method in claim 15, further comprising compressing said data blocks in said memory when said used memory sector count is below a priority compress memory threshold, irrespective of a memory access request activity of said compressed memory manager.

17. The method in claim 14, further comprising always storing data blocks having all zeros as a zero entry in said memory, wherein said zero entry avoids using memory sectors.

18. The method in claim 14, wherein said compressing further comprises compressing data blocks having a higher compressibility before compressing data blocks having a lower compressibility.

19. The method in claim 14, wherein said decompressing only avoids decompressing uncompressed data blocks.

20. The method in claim 14, wherein said compressing avoids compressing data blocks held in a cache of said computer system.

21. A method of utilizing a sectored compressed memory in a computer system, said method comprising:

monitoring a used memory sector count of said memory;

compressing data blocks in said memory when said used memory sector count is above a compress memory threshold; and decompressing said data blocks when said used memory sector count is below an expand memory threshold, wherein said compressing further comprises compressing data blocks accessed less recently before compressing data blocks accessed more recently.

22. The method in claim 21, wherein said compressing and said decompressing are performed when a compressed memory manager in said computer system is not performing memory access requests.

23. The method in claim 22, further comprising compressing said data blocks in said memory when said used memory sector count is below a priority compress memory threshold, irrespective of a memory access request activity of said compressed memory manager.

24. The method in claim 21, further comprising always storing data blocks having all zeros as a zero entry in said memory, wherein said zero entry avoids using memory sectors.

25. The method in claim 21, wherein said compressing further comprises compressing data blocks having a higher compressibility before compressing data blocks having a lower compressibility.

26. The method in claim 21, wherein said decompressing only avoids decompressing uncompressed data blocks.

27. The method in claim 21, wherein said compressing avoids compressing data blocks held in a cache of said computer system.

* * * * *